(12) United States Patent  (10) Patent No.: US 6,718,239 B2
Rayner  (45) Date of Patent: Apr. 6, 2004

(54) VEHICLE EVENT DATA RECORDER INCLUDING VALIDATION OF OUTPUT

(75) Inventor: Gary A. Rayner, San Diego, CA (US)

(73) Assignee: I-Witness, Inc., San Diego, CA (US)

( * ) Notice: Subject to any disclaimer, the term of this patent is extended or adjusted under 35 U.S.C. 154(b) by 185 days.

(21) Appl. No.: 09/732,813

(22) Filed: Dec. 11, 2000

(65) Prior Publication Data

US 2001/0005804 A1 Jun. 28, 2001

Related U.S. Application Data

(63) Continuation-in-part of application No. 09/669,449, filed on Sep. 25, 2000, now Pat. No. 6,449,540, which is a continuation-in-part of application No. 09/611,891, filed on Jul. 7, 2000, now Pat. No. 6,405,112, which is a continuation-in-part of application No. 09/405,857, filed on Sep. 24, 1999, now Pat. No. 6,389,340, which is a continuation-in-part of application No. 09/020,700, filed on Feb. 9, 1998, now abandoned.

(51) Int. Cl.[7] .............................................. G08G 1/017
(52) U.S. Cl. ..................... 701/35; 340/937; 340/541; 340/426; 340/539; 380/25; 348/155
(58) Field of Search .......................... 701/35; 340/937, 340/541, 426, 539, 540, 438; 348/148, 143, 155; 380/9, 25, 30

(56) References Cited

U.S. PATENT DOCUMENTS

| | | | | |
|---|---|---|---|---|
| 5,497,419 A | * | 3/1996 | Hill | 380/9 |
| 5,815,093 A | * | 9/1998 | Kikinis | 340/937 |
| 6,011,492 A | * | 1/2000 | Garesche | 340/904 |
| 6,163,338 A | * | 12/2000 | Johnson et al. | 348/148 |
| 6,389,340 B1 | * | 5/2002 | Rayner | 701/35 |
| 6,405,112 B1 | * | 6/2002 | Rayner | 701/35 |

* cited by examiner

Primary Examiner—Thomas G. Black
Assistant Examiner—Tuan C To
(74) Attorney, Agent, or Firm—Calif Tervo

(57) ABSTRACT

An event recorder (10) mounted in a vehicle (20) includes sensors, including image sensor (60), sound sensor (90), location sensor (95), and vehicle performance sensors, and a capture circuit for storing sensed data signals around a triggering event. A CPU and program memory (74) are programmed to perform a validation function, such as a one-way hash function, on the captured sensor signal while transferring it to persistent memory device (100) so as to derive a validation value which is also stored in persistent memory device (100). To later verify that the data have not be tampered with, the stored data are operated on by the same validation function so as to derive an audit validation value, the audit validation value is compared with the validation value for equality and the outcome of the comparison is indicated.

42 Claims, 2 Drawing Sheets

VEHICLE EVENT DATA RECORDER INCLUDING VALIDATION OF OUTPUT

CROSS-REFERENCE TO RELATED APPLICATIONS

This application is a continuation-in-part of application Ser. No. 09/669,449, filed: Sep. 25, 2000, titled VEHICLE OPERATOR PERFORMANCE RECORDER TRIGGERED BY DETECTION OF EXTERNAL WAVES, now U.S. Pat. No. 6,449,540 B1 issued: Sep. 10, 2002, that is continuation-in-part of application Ser. No. 09/611,891, filed: Jul. 7, 2000, titled VEHICLE OPERATOR PERFORMANCE MONITOR WITH ENHANCED RETRIEVAL CAPABILITIES, now U.S. Pat. No. 6,405,112 B1 issued Jun. 11, 2002, that is a continuation-in-part of application Ser. No. 09/405,857, filed Sep. 24, 1999, titled VEHICLE DATA RECORDER, now U.S. Pat. No. 6,389,340 B1 issued May 14, 2002 that is a continuation-in-part of, now abandoned, application Ser. No. 09/020,700 filed Feb. 9, 1998, titled SEQUENTIAL IMAGE STORAGE SYSTEM WITH PRE-EVENT HISTORY, which are incorporated herein in their entirety.

FIELD OF THE INVENTION

This invention relates in general to a vehicle event data recorder that continuously monitors a vehicle's operation and the surrounding environment and that records, for later review, automobile operating parameters provided by sensors, including audio and visual sensors, and more particularly relates to such an event recorder including a validation system for validating that output data have not been changed from the original recorded data.

BACKGROUND OF THE INVENTION

The digital data recorded from a vehicle event recorder can be used as evidence of events surrounding a "triggering event" such as a traffic accident, a traffic stop by a law official, or a crime or altercation.

The veracity of the recorded evidence can be challenged. The one attacking the veracity of the recorded evidence argues that the evidence has been in the control of the offeror of the evidence and may have been altered. For example, sensor information as to the vehicle speed or acceleration, or to the time and place may have been changed as desired by the offeror.

Therefore, there has been a need for a vehicle event data recorder including a validation system, secure from tampering, that indicates if the recorded data have been changed. The evidentiary value of the validated data is thereby substantially increased.

SUMMARY OF THE INVENTION

A preferred embodiment of the invention is an event recorder mounted in a vehicle including sensors and means for recording signals from the sensors, including surrounding audio and visual information, in the time period before, during, and after a triggering event.

The recorder includes a CPU and program memory programmed to perform a validation function, such as a one-way hash function, on the captured sensor signal while transferring it to a persistent memory device so as to derive a validation value, which is also stored in an address block, such as a file, in the persistent memory device. To later verify that the data have not been tampered with, the file is operated on by the same validation function so as to derive an audit validation value, the audit validation value is compared with the validation value for equality and the outcome of the comparison is indicated. The validation function and the comparison are secure from tampering.

The captured information can be used as evidence of innocence in an accident or of a traffic violation or of unwarranted pullover, stopping or harassment by police.

Other features and many attendant advantages of the invention will become more apparent upon a reading of the following detailed description together with the drawings wherein like reference numerals refer to like parts throughout.

DETAILED DESCRIPTION OF THE INVENTION

Figure 1:
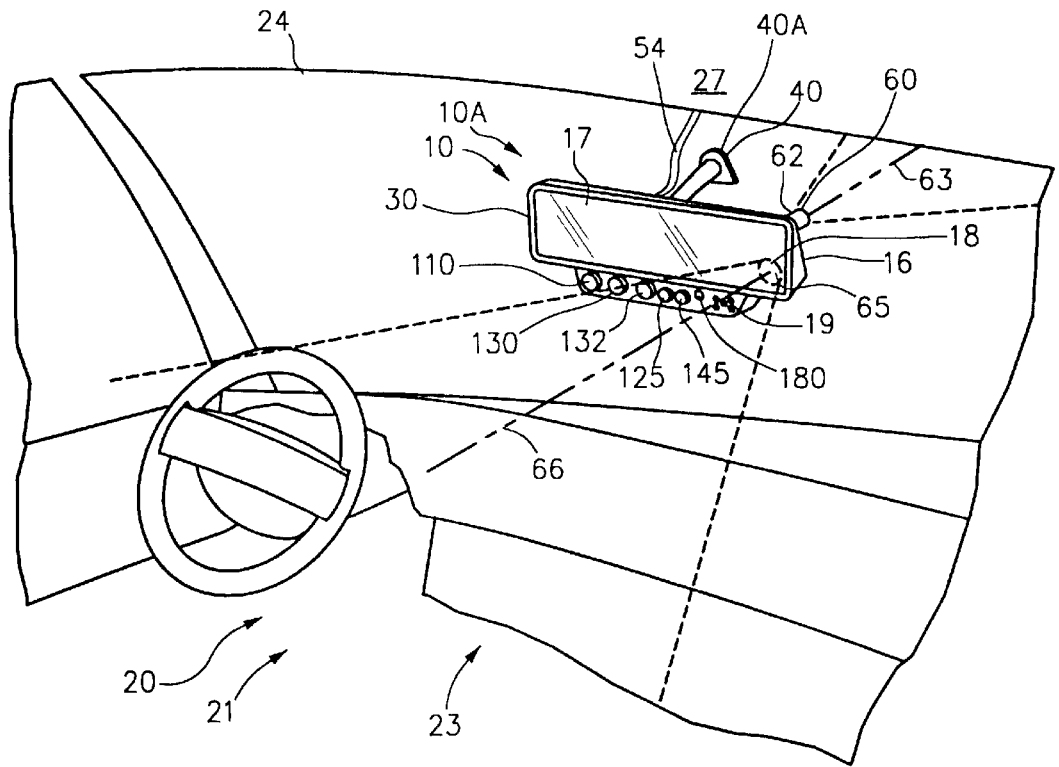
FIG. 1 is a perspective view of a first exemplary embodiment of the event recorder of the invention combined with a rear view mirror of a vehicle.

FIG. 1 is a perspective view of a first exemplary embodiment 10A of the event recorder 10 of the invention combined with a rear viewing device 16 in the cabin 23 of a vehicle 20, such as an automobile 21. Automobile 21 includes a front windshield 24 and cabin headliner 27. A conductor 54 connects recorder 10 with vehicle power and one or more input data signal lines, as will be more fully discussed later. Conductor 54 may comprise a cable of one or more electrical or optical conduits.

Recorder 10 includes a housing 30. A rear viewing device 16, including a rear viewing surface, such as mirror 17, is mounted to housing 30. Other rear viewing surfaces are contemplated, such as video screens. Mirror 17 may include an aperture, a transparent area, or a partially mirrored portion, such as half-mirrored portion 18 for transmitting light to camera 65 behind mirror 17. The front of mirror 17 or housing 30 includes an aperture 19 for communicating sound to a microphone.

A mounting means 40, such as mount 40A, mounts recorder 10 in automobile 21 such that mirror 17 is positioned in the view of an operator for rearward viewing in the manner of a conventional rear view mirror.

Figure 2:
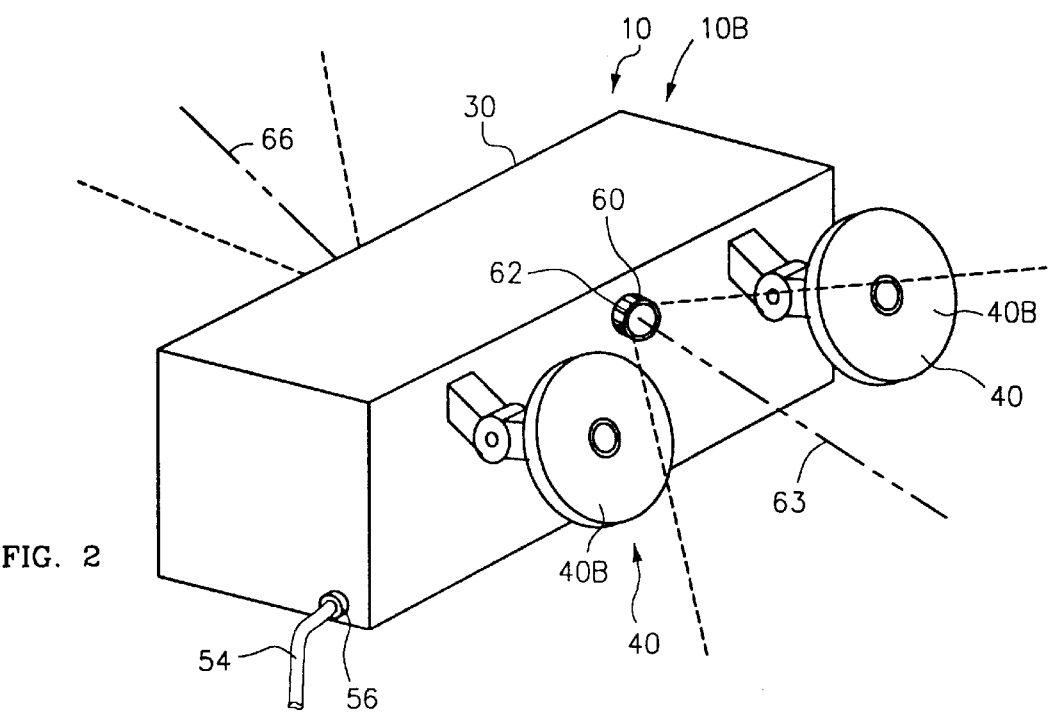
FIG. 2 is a perspective view of an second exemplary embodiment of the event recorder of the invention including suction cup mounts for mounting to a vehicle windshield.

FIG. 2 is perspective view of an second exemplary embodiment 10B of the event recorder 10 of the invention including a housing 30 and mounting means 40, such as suction cup mounts 40B for mounting to a vehicle windshield 24. A connector, such as plug 56 couples conductor 54 to recorder 10B.

Figure 3:
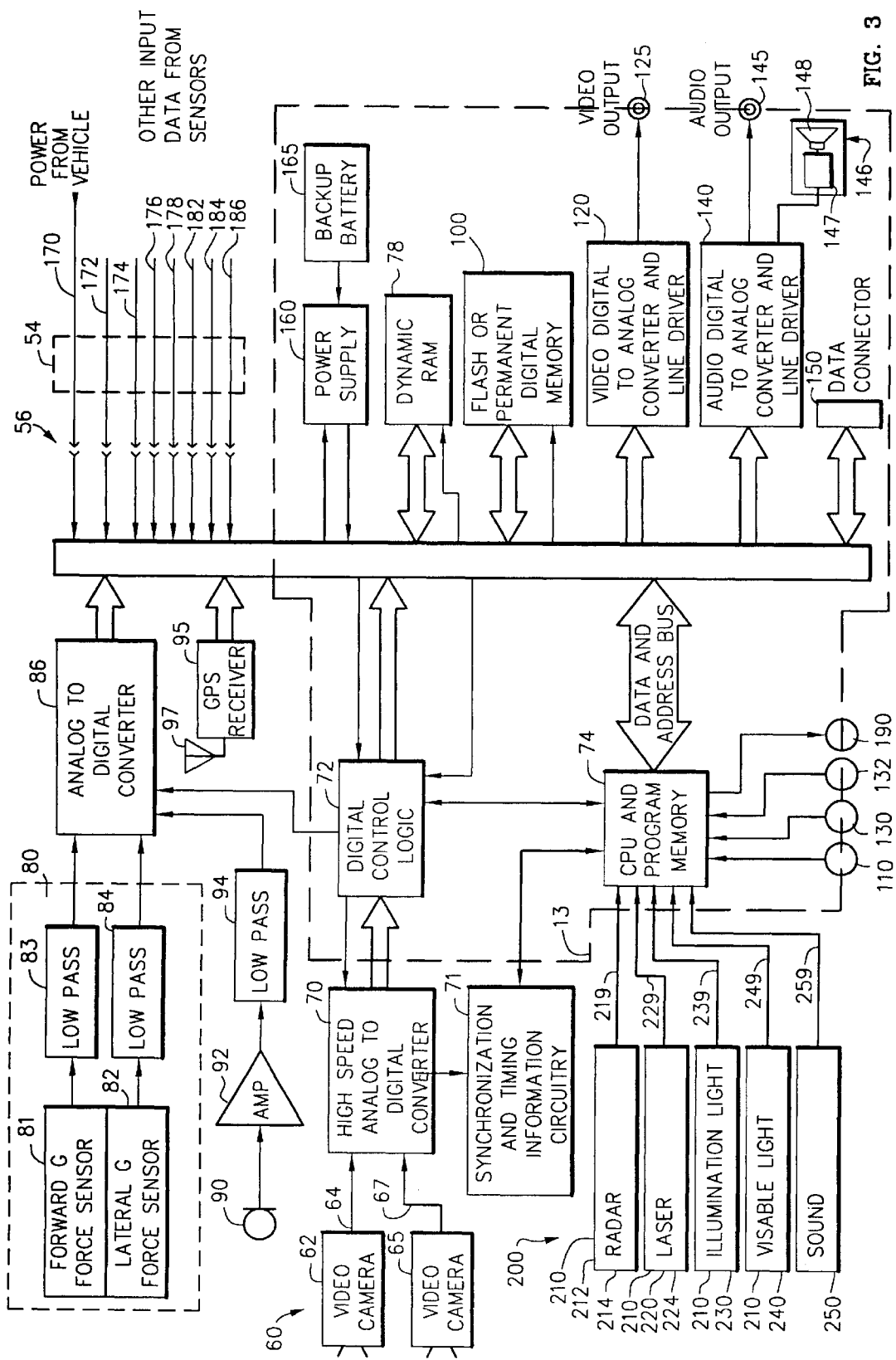
FIG. 3 is an exemplary schematic block diagram of the event recorder.

FIG. 3 is a schematic block diagram of the electronics and associated elements of vehicle recorder 10 that are contained within housing 30. Image sensor means 60, such as first image sensing means, such as forward viewing video camera 62, and second image sensing means, such as rearward viewing video camera 65, are connected to housing 30 for sensing optical images and for producing an image signal representing the sensed image. Cameras 62, 65, which are preferably charge-coupled device (CCD) or cMOS silicon sensor arrays, generate signals corresponding to video imagery. Referring briefly again to FIG. 1, camera 62 is mounted in housing 30 with its optical axis 63 directed forwardly with respect to vehicle 20, and camera 65 is mounted in housing 30 with its optical axis 66 directed rearward with respect to vehicle 20. Both axes 63 and 66 are thus generally aligned with the direction of travel of vehicle 20 and perpendicular to windshield 24. Preferably, the camera's fields-of-view cover the entire area forward of and rearward of recorder 10. The incorporation of additional cameras, such as side viewing cameras, is contemplated. Preferably, cameras 60 capture a 360 degree view.

Returning to FIG. 3, a high-speed analog-to-digital (A/D) convertor 70 digitizes the signals produced by cameras 62 and 65 on lines 64 and 67, respectively, and multiplexes them onto a digital data bus via digital control logic 72. Recorder 10 operates under the control of a central processing unit 74. Central processing unit (CPU) 74 may include a microprocessor, microcontroller, or similar device and associated random access memory and program memory. CPU 74 is programmed to perform the functions described in this specification. Because the descriptions of the functions below are sufficient to enable any person skilled in the art to which this invention relates to program CPU 74, program code and the manner in which it is programmed are not described in this specification. CPU 74 is synchronized to A/D converter 70 via synchronization and timing information circuitry 71. Digital logic 72 may compress or encrypt data or data stream from sensors.

Under control of CPU 74, digital signals representing the video imagery are stored in dynamic random-access memory (dRAM) 78 that is configured as a continuous-loop buffer. CPU 74 or associated address counter circuitry defines the continuous-loop scheme by employing wrap-around memory addressing, in which the highest memory location in a predetermined addressing sequence is adjacent or next to the lowest. Incoming digitized data signals are written to memory locations until all allocated locations have been written to, at which time the data signals stored at the next location in the sequence are overwritten with further incoming data signals.

Accelerometer circuit 80 includes means, such as a pair of accelerometers, such as forward accelerometer or G-force sensor 81 and lateral accelerometer or G-force sensor 82. G-force sensors 81,82 are coupled to another A/D converter 86 via low-pass filters 83 and 84, respectively. Although accelerometers aligned with the lateral and longitudinal axes of the vehicle are described, acceleration data can be obtained from other arrangements of non-parallel accelerometers.

Microphone 90 is coupled to A/D converter 86 via an amplifier 92 and another low-pass filter 94. Microphone 90, being integrated within enclosure 30 (see FIG. 1), is particularly sensitive to sounds occurring inside cabin 23 of vehicle 20, such as the voices of the driver and any passengers. Other sounds, such as tire screeches, warning horns, sirens and collisions are also picked up.

Under control of CPU 74, A/D converter 86 multiplexes and digitizes the signals produced by these sensors. The digitized input data are stored in volatile buffer memory, such as dRAM 78, along with the digital signals representing the visual imagery.

Global positioning system (GPS) receiver 95 receives GPS satellite signals, determines from them the geographical position of vehicle 20 and the universal time, and produces a location sensor signal and a time sensor signal therefrom representing the sensed location and sensed time. GPS receiver 95 and its antenna 97 are, like all other electronics and associated elements described above, disposed inconspicuously and securely inside housing 30. This location harmonizes with the location of recorder 10 on or near windshield 24 because radio frequency energy emanating from satellites above vehicle 20 penetrate windshield 24 more readily than metallic portions of vehicle 20.

Power may be supplied by a power supply 160, battery 165 or direct from vehicle power line 170 of vehicle conductor 54 connected to recorder 10 via coupler 56 to input conductor 54. Vehicle conductor 54 can include other conductors or lines from vehicle sensors including: speedometer signal input line 172 providing the vehicle speed from a vehicle speedometer; tachometer line 174 providing engine revolutions from a tachometer; temperature line 176 providing external and internal temperatures from temperature sensors; a distance line 178 providing trip distance from a trip odometer, a braking line 182 providing braking information from a brake sensor; and one or more engine operating parameter lines 184, 186 providing engine parameters, such as temperature, fuel flow rate, power output, etc.

CPU 74 copies data from buffer memory 78 to a more permanent non-volatile memory, such as a flash card, permanent digital memory or persistent memory 100, upon detection of a trigger signal, i.e. a data input signal reaching a predetermined level representing a triggering event. For example, CPU 74 monitors the digitized signals representing the acceleration forces to which G-force sensors 81 and 82 are responsive, and if CPU 74 determines that the acceleration data exceed a predetermined threshold value indicative of a collision or other event that would warrant investigation, CPU 74 copies data from buffer memory 78 to persistent memory 100.

Memories 78 and 100 thus together define a two-tier system, in which the first tier records data in a continuous-loop fashion, and the second tier provides more permanent storage for data from the first tier in response to a triggering event. Data stored in persistent memory 100 in accordance with this scheme are not overwritten unless the entire system is reset by an operator. CPU 74 may be programmed to continue data acquisition after occurrence of the triggering event for some predetermined time interval. Thus, so long as a sufficient amount of pre-event data are retained and not over-written, additional frames of visual data or other sensory data can be gathered during and after receipt of a trigger signal and stored in memory 100 following the pre-event data.

A trigger signal, defining a triggering event, can also be produced manually by activation of a "panic" or trigger button 110 by an operator, such as the vehicle driver. Trigger button 110 may be placed on the steering wheel or other convenient location and the output coupled to vehicle conductor 54 for communication with CPU 74.

A trigger signal may be produced by each of one or more wave pattern detectors 200. Each wave pattern detector 200 detects and recognizes the presence of a predetermined wave that is produced external vehicle 20 and produces a trigger signal denoting presence of the predetermined wave. Electromagnetic wave detector 210, such as radio frequency wave detector 212, such as speed radar detector 214 detects predetermined radar wave, such as that produced by police for vehicle speed determination, and produces a trigger signal on line 219 denoting the wave presence. A second electromagnetic wave detector 210, such as light wave detector 220, such a laser light detector 224 detects a predetermined laser light, such as is used by the police for vehicle speed determination, and produces a trigger signal on line 229 denoting the wave presence. A third electromagnetic wave detector 210, such as light wave detector 220, such a picture illumination light wave detector 230 detects a predetermined light such as infrared or visible flash used for illumination in taking images, such as used by police surveillance or for unmanned police cameras monitoring red lights, and produces a trigger signal on line 239 denoting the wave presence. A fourth electromagnetic wave detector 210, such as light wave detector 220, such as notification of presence light wave detector 240 for detection of a notification of presence light wave, such as the flashing lights used by police emergency and emergency vehicles to notify others of the presence of the emergency vehicle and the need to comply with the orders or right of way, and produces a trigger signal on line 249 denoting the wave presence. Sound wave detector 250 detects and recognizes the presence of a predetermined sound wave, such as a notification of presence sound wave, such as a police or emergency vehicle siren produced to notify others of the presence of the emergency vehicle and the need to comply with the orders or right of way, and produces a trigger signal on line 259 denoting the wave presence.

Detectors 200 detect and recognize the presence of a predetermined wave produced external the vehicle for a purpose other than being detected by a detector 200. Typically the waves are produced for speed determination, image taking, or notification of presence. The detected waves are produced external the vehicle by a party not associated with the vehicle. The party is typically a governmental entity, such as the police or fire department, or an emergency vehicle.

CPU 74 controls a display 190, such as an LCD or LED display, to provide status information such as whether recorder 10 is powered-up and otherwise operational and whether a triggering event has occurred and the nature of the triggering event.

A playback circuit 13 at least provides for downloading the sensed signals from persistent memory 100 to an output port, such as video output connector 125. Playback circuit 13 includes operator control means, such as switch buttons 130 and 132, which produce a control signal responsive to operator activation to initiate and control the retrieval of stored data. Responsive to activation of buttons 130,132 in a predetermined manner, CPU 74 causes DRAM memory 78 to be addressed in sequence and provide the stored data on the data bus. CPU 74 also controls a video digital-to-analog (D/A) converter 120 and an audio D/A converter 140, causing them to convert the data signals read from memory 78 to analog format. A video signal representing the stored video imagery data is provided at a video output connector 125. By connecting a video monitor (not shown) to connector 125, one can view the recorded imagery and other recorded data, such as time, date, g-forces, speed and engine speed, superimposed, such as in numeric or graphical format, on the video display. An audio signal representing the stored audio data is provided at an audio output connector 145. By connecting a speaker (not shown) to connector 145, one can listen to the recorded sound. A data connector 150 is also included that provides access to the data on the data bus, either directly or via suitable input/output interface circuitry (not shown). Recorder 10 can be programmed via connector 150 as well.

An enunciator 146, such as speaker module 147, including voice simulation circuitry or recorded voice, amplifier, and speaker 148, provides aural feedback to the operator. Speaker module 147 is connected to line driver 140, and produces messages indicative of sensor signals or triggering events. For example, the operator may be warned that speed, engine RPM or g-forces are excessive.

Preferably, mechanical and electrical mounting connection for recorder 10 are both readily releasable such that recorder 10 is quickly, easily and conveniently removable from automobile 21 to a remote location for playback of captured signals. Power for playback could be provided by battery, such as internal battery 165, or by an a/c adapter. Video output 125 and audio output 145 are readily attachable to many devices, such as a television set, or general purpose computer for playback. Switches 130 and 132 can control playback.

As an alternative to removing the entire recorder 10 from vehicle 20 to a remote location for playback, playback circuit 13 is housed in a playback module that is readily removable from housing 30 and the remainder of recorder 10 and is readily connectable to many devices, such as a personal computer (PC), for retrieving the stored data. Data connector 150 could be a USB cable, for example, and readily connect to a PC. Upon reattachment, appropriate contacts couple playback circuit 13 with the remainder of the circuitry of module 10.

As another alternative to removing the entire recorder 10 from vehicle 20 to a remote location for playback, persistent memory 100 may be housed in a device, such as card, that is readily removable from vehicle 20 to a remote location for playback on a reader compatible with the memory medium. Suitable readers for reading most memory formats are well known in the art.

The CPU and program memory 74 are programmed to perform a secure validation function on the terminated captured sensor signals so as to derive a validation value. In a preferred embodiment, this is done while transferring the terminated captured sensor signals from dynamic RAM 78 to an address block, such as a file, in persistent memory 100 for storage. The validation value is stored in a persistent memory device, such as 100. Alternatively, the captured sensor signals and validation function may be transmitted to another device. Also, the captured sensor signals may be encrypted or compressed before or after being operated upon by the validation function. Such encryption may be performed by the microprocessor or may be performed by an encryption means, such as an encryption circuit (not shown) as is known in the art. Likewise, such compression may be performed by the microprocessor or may be performed by a compression means, such as a compression circuit (not shown), known in the art. An advantage of not altering the captured data signals, such as by encryption or compression, is that they may be more easily read.

A validation function performs algorithm processes on the data string, preferably on the entire data string, to obtain a validation value. The validation function may be a hash value calculation, digital signature, or another function of types known in the art. In some circumstances, a one way hash calculation is preferred because of its high speed. The hash function is retained in program memory 74 and secure from tampering.

One-way hashing is known to those skilled in the art. A one-way hash function is a function that is simple to compute in a forward direction, but difficult to compute in a reverse direction. A one-way hash function, H(D), operates on an arbitrary-length input, D, which in the present invention is comprised of the terminated captured sensor signals (data) in dynamic RAM 78. The hash function performed on D returns a fixed-length hash value, h where h=H(D). There are many functions that can take an arbitrary-length input and return an output of fixed length, but one-way hash functions have the following additional characteristics: given D, it is easy to compute h; given h, it is hard to compute D; and given D, it is hard to find other data, D', such that H(D)=H(D').

A message digest (MD) algorithm, such as the "MD5" algorithm, may be used as a one-way hash calculation. The MD5 algorithm produces an N-bit hash, or message digest, of the data. The MD5 algorithm is very sensitive in that a change in a single bit in the selected contents statistically results in half of the hash value bits changing. The MD5 algorithm also is known for its speed and simplicity. Speed is an important consideration in that the time demands placed on the CPU cannot be so great as to unacceptably interfere with ordinary system processes. Other one-way hash algorithms that can be used in accordance with the present invention include, but are not limited to: Snerfu, H-Hash, MD2, MD4, Secure Hash Algorithm (SHA), and HAVAL. One skilled in the art will readily be able to program memory 74 to carry out the one-way hash process.

The validity of any file for stored terminated captured sensor signal is determined by performing the same validation function thereon so as to derive an audit validation value and comparing the audit validation value with the validation value for equality. If the stored captured sensor signals were encrypted or compressed, they may need decryption or expansion before being operated upon by the validation function. This derivation and comparison may be performed in several manners.

In one exemplary embodiment, CPU and program memory 74 are programmed to perform the audit validation function responsive to directive from a key, such as validation key 132 or from data connector 150, to compare the validation value with the audit validation value, and to indicate the outcome of the comparison, such as on display 190 or on output to data connector 150 or to the video or audio ports 125, 145.

In a second exemplary embodiment, the stored terminated captured sensor signal and the stored validation value are transferred to a computer, such as a general purpose computer, such as a personal computer. This transfer can be performed by such as by outputting the signal and value on output ports 125, 145 or data connector 150 or by physically removing persistent memory 100 for reading by the computer or by a peripheral to the computer. The computer is preprogrammed with the validation function or the validation function is read in from a secure source. The computer performs the same validation function on the transferred terminated captured sensor signal so as to derive the audit validation value, compares the audit validation value with the validation value for equality and indicates the outcome of the comparison, such as on a monitor. Alternatively, the audit validation function is performed by an audit validation function means, such as a validation circuit (not shown), which is known to the art.

Having described the invention, it can be seen that it provides a very convenient device and method for authenticating data acquired by an event data recorder, particularly for use as evidence.

Although specific embodiments of the invention have been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. In combination:
    a vehicle; and
    an event recorder mounted to said vehicle comprising:
        sensors for producing sensor signals, including:
            first image sensing means for sensing optical images and for producing a first image sensor signal representing the sensed images;
        a microprocessor including memory; wherein said microprocessor receives the sensor signals from said sensors and captures the sensor signals including the first image sensor signal in readily readable form during a time period and performs a validation function on the captured sensor signals including the first image sensor signal in readily readable form so as to derive a validation value while leaving the captured first image sensor signal in readily readable form.

2. The combination of claim 1 wherein;
    said event recorder further includes:
        output port means; and wherein:
            said microprocessor transmits the sensor signals including the first image sensor signal in readily readable form and validation value via said output port means.

3. The combination of claim 1 wherein;
    said event recorder further includes:
        a persistent memory device; and wherein:
            said microprocessor stores the captured data signals in a file on said persistent memory device; and performs the same validation function on the file so as to derive an audit validation value while leaving the captured first image sensor signal in the file in readily readable form.

4. The combination of claim 3 wherein:
    said event recorder further includes:
        a validation indicator; and wherein:
            said microprocessor compares the audit validation value with the validation value for equality, and indicates the outcome of the comparison on said validation indicator.

5. The combination of claim 1 wherein;
    said event recorder further includes:
        a persistent memory device; and
        an audit validation function means; and wherein:
            said microprocessor stores the captured data signals in a file on said persistent memory device; and said audit validation function means performs the same validation function on the file so as to derive an audit validation value while leaving the captured first image sensor signal in the file in readily readable form.

6. The combination of claim 5 wherein:
    said event recorder further includes:
        a validation indicator; and wherein:
            said audit validation function means compares the audit validation value with the validation value for equality, and indicates the outcome of the comparison on said validation indicator.

7. The combination of claim 1 wherein;
    said event recorder further includes:
        output port means; and wherein:
            said microprocessor compares the audit validation value with the validation value for equality, and indicates the outcome of the comparison on said output port means.

8. The combination of claim 7 wherein:
said output port means includes a video output port.

9. The combination of claim 1 wherein:
said sensors further include:
an accelerometer for sensing acceleration and for producing an acceleration sensor signal representing the sensed acceleration.

10. The combination of claim 1 wherein:
said sensors further include:
a location sensor for sensing geographical location and for producing a location sensor signal representing the sensed location.

11. The combination of claim 1 wherein:
said sensors further include:
a time sensor for sensing the time and for producing a time sensor signal representing the sensed time.

12. The combination of claim 1 wherein:
said sensors further include:
a speedometer for sensing the speed and for producing a speed sensor signal representing the sensed speed.

13. The combination of claim 1 wherein:
the validation function is a hash calculation.

14. The combination of claim 1 wherein:
the validation function and the comparison are secure from tampering.

15. In an event recorder that has captured a sensor signal including an image signal in readily readable form while attached to a vehicle, a method of detecting memory tampering, the method comprising the steps of:
performing a validation function on the captured sensor signal including the image signal in readily readable form so as to derive a validation value while leaving the captured image signal in readily readable form.

16. The method of claim 15 further including the step of:
transmitting the captured sensor signal including the image signal in readily readable form and validation value via an output port.

17. The method of claim 16 wherein:
the transmitted captured sensor signals are in readily readable form.

18. The method of claim 15 further including the step of:
storing the captured sensor signal in a file in a memory; and
performing the same validation function on the file so as to derive an audit validation value while leaving the captured image signal in the file in readily readable form.

19. The method of claim 18 further including the step of:
comparing the audit validation value with the validation value for equality; and
indicating the outcome of the comparison.

20. The method of claim 19 wherein:
the steps of performing the validation function and the comparing are secure from tampering.

21. In an event recorder that has captured a sensor signal including an image signal in readily readable form while attached to a vehicle, a method of detecting memory tampering, the method comprising the steps of:
performing a hash validation function on the captured sensor signal including the image signal in readily readable form so as to derive a valid hash value while leaving the captured image signal in readily readable form.

22. The method of claim 21 further including the step of:
transmitting the captured sensor signals including the image signal in readily readable form and valid hash value via an output port.

23. The method of claim 22 wherein:
the transmitted captured sensor signals are in readily readable form.

24. The method of claim 21 further including the step of:
storing the captured sensor signal in a file in a memory; and
performing the same hash validation function on the file so as to derive an audit hash value while leaving the captured image signal in the file in readily readable form.

25. The method of claim 24 further including the step of:
comparing the audit hash value with the valid hash value for equality; and
indicating the outcome of the comparison.

26. The method of claim 21 wherein:
the steps of performing the validation function and the comparing are secure from tampering.

27. The method of claim 21 wherein:
the sensors further include an accelerometer for sensing acceleration and for producing an acceleration sensor signal representing the sensed acceleration.

28. The method of claim 21 wherein:
the sensors signal further includes a location sensor signal representing the sensed location.

29. The method of claim 21 wherein:
the sensor signal further includes a time sensor signal representing the sensed time.

30. The method of claim 21 wherein:
the sensor signal further includes a speed sensor signal representing the sensed speed.

31. A method of detecting tampering with a captured data sensor signal including an image signal in readily readable form of an event recorder; the method comprising the steps of:
performing a validation function on the captured sensor signal including the image signal in readily readable form so as to derive a validation value while leaving the captured image signal in readily readable form.

32. The method of claim 31 further including the step of:
transferring the captured sensor signal including the image signal in readily readable form and the validation value to a general purpose computer.

33. The method of claim 32 further including the step of:
performing, with the general purpose computer, the same validation function on the transferred captured sensor signal so as to derive an audit validation value.

34. The method of claim 33 further including the step of:
comparing, with the general purpose computer, the audit validation value with the validation value for equality; and
indicating the outcome of the comparison.

35. The method of claim 31 wherein:
the step of performing a validation function on the captured sensor signal is performed while transferring for storing the captured sensor signal on a persistent memory device; and further including the step of:
storing the validation value in a persistent memory device.

36. In combination:
a vehicle; and an event recorder mounted to said vehicle including:
  first image sensing means for sensing optical images and for producing a first image sensor signal representing the sensed images;
  a microprocessor including memory; wherein said microprocessor receives and captures the first image sensor signal in readily readable form during a time period and performs a validation function on the captured first image sensor signal in readily readable form so as to derive a validation value while leaving the captured first image sensor signal in readily readable form.

37. The combination of claim 36 wherein;
said event recorder further includes:
  output port means; and wherein:
    said microprocessor transmits the first image sensor signal in readily readable form and validation value via said output port means.

38. The combination of claim 36 wherein:
said event recorder further includes:
  a persistent memory device; and wherein:
    said microprocessor stores the captured first image sensor signal in a file on said persistent memory device; and performs the same validation function on the file so as to derive an audit validation value while leaving the captured first image sensor signal in the file in readily readable form.

39. The combination of claim 38 wherein:
said event recorder further includes:
  a validation indicator; and wherein:
    said microprocessor compares the audit validation value with the validation value for equality, and indicates the outcome of the comparison on said validation indicator.

40. The combination of claim 36 wherein;
said event recorder further includes:
  a persistent memory device; and
  an audit validation function means; and wherein:
    said microprocessor stores the captured first image signal in a file on said persistent memory device; and said audit validation function means performs the same validation function on the file so as to derive an audit validation value while leaving the captured first image sensor signal in the file in readily readable form.

41. The combination of claim 40 wherein:
said event recorder further includes:
  a validation indicator; and wherein:
    said audit validation function means compares the audit validation value with the validation value for equality, and indicates the outcome of the comparison on said validation indicator.

42. The combination of claim 36 wherein;
said event recorder further includes:
  output port means; and wherein:
    said microprocessor compares the audit validation value with the validation value for equality, and indicates the outcome of the comparison on said output port means.

* * * * *